| United States Patent [19] | [11] 3,899,529 |
| Witzel | [45] Aug. 12, 1975 |

[54] AROYL SUBSTITUTED NAPHTHALENE ACETIC ACIDS

[75] Inventor: Bruce E. Witzel, Westfield, N.J.

[73] Assignee: Merck & Co., Inc., Rahway, N.J.

[22] Filed: Feb. 22, 1973

[21] Appl. No.: 334,557

[52] U.S. Cl.............. 260/517; 260/141; 260/556 C; 260/558 R; 260/294.8 B; 260/558 S; 260/558 A; 260/294.9; 260/558 D; 260/559 R; 260/295 R; 260/559 T; 260/559 S; 260/295 AM; 260/559 A; 260/591; 260/296 R; 424/263; 424/269; 260/297 B; 424/270; 424/275; 260/302 R; 424/308; 424/309; 260/306.8 R; 424/317; 424/319; 260/308 R; 424/324; 424/321; 260/326 A; 260/332.2 A; 260/332.3 P; 260/332.5; 260/347.2; 260/347.3; 260/347.4; 260/347.7; 260/347.8; 260/469; 260/470; 260/465 D; 260/471 R; 260/473 F; 260/479 R; 260/516; 260/556 AR; 260/556 B

[51] Int. Cl.²................... C07C 65/20; C07C 69/95; C07C 103/22

[58] Field of Search........ 260/517, 516, 479 R, 470, 260/465 D, 469, 558 R, 558 S, 558 A, 558 D, 559 R, 559 T, 559 S, 559 A, 471 R, 473 F

[56] References Cited
UNITED STATES PATENTS

| 3,362,988 | 1/1968 | Bolhofer et al..................... 260/516 |
| 3,792,170 | 2/1974 | Shen et al........................... 424/303 |

OTHER PUBLICATIONS

Weeks et al., Jour. Amer. Chem. Soc., Vol. 91(2), (1969), pp. 477–481.

Sammour et al., J. Prakt. Chem., Vol. 314(5–6), (1972), pp. 906–914.

*Primary Examiner*—James A. Patten
*Attorney, Agent, or Firm*—Stanley E. Anderson; Mario A. Monaco; Harry E. Westlake, Jr.

[57] ABSTRACT

Aroyl naphthalene acetic acids useful as anti-inflammatory, anti-pyretic and analgesic agents. Also claims method of treating pain, fever and inflammation; pharmaceutical composition; and process for preparing the aroyl naphthalene acetic acids.

12 Claims, No Drawings

AROYL SUBSTITUTED NAPHTHALENE ACETIC ACIDS

SUMMARY OF THE INVENTION

This invention relates to novel aroyl substituted naphthalene acetic acids and derivatives thereof, to pharmaceutical compositions, to a method of treating fever, pain and inflammation by employing these aroyl naphthalene acetic acids and to a process for their preparation. The disclosed class of compounds in this invention exhibit anti-inflammatory activity and are effective in the prevention and inhibition of edema and granuloma tissue formation. They also possess a useful degree of anti-pyretic and analgesic activity.

BACKGROUND OF THE INVENTION

There has been much research carried on in the past two decades for development of anti-inflammatory drugs. As a result, a great many new drugs have been synthesized. Most of these have been steroids of the 11-oxygenated pregnane series. These, while highly effective, have the drawback of causing many side effects. There has also been a concentrated effort in anti-inflammatory research in the indole and indene series with the result of many useful drugs. Further, other non-steroidal anti-inflammatory agents have been disclosed in Belgium Pat. No. 747,812 which discloses naphthalene acetic acids and British Pat. No. 1,164,585 which disclosed benzoyl phenylacetic acids.

I have found that certain aroyl substituted naphthalene acetic acids are valuable anti-inflammatory agents. These aroyl naphthalene acetic acids are substantially different from prior art compounds in that they are aroyl compounds of the naphthalene series.

DESCRIPTION AND PREFERRED EMBODIMENTS

This invention relates to a class of chemical compounds which contain an aroyl radical attached to a substituted naphthalene acetic acid or derivative. The compounds are more specifically described by the following structural formula:

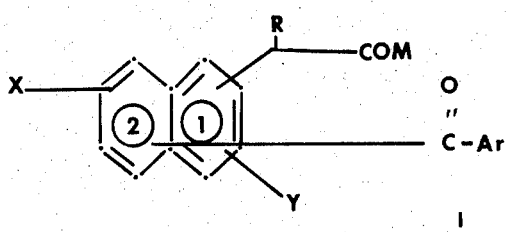

wherein:

R is hydrogen or alkyl;

X and Y are each hydrogen, halogen, alkyl, alkoxy, amino, alkylamino, dialkylamino, alkylthio, alkylsulfinyl, alkylsulfonyl, trihaloalkyl, dialkylaminoalkyl, dialkylaminoalkoxy, cyano, alkanoyl, nitro, hydroxy, acyloxy, acylamino, aminoalkyl, alkylaminoalkyl, hydroxyalkyl, alkoxyalkyl, alkylmercaptoalkyl, aryl, aryloxy, arolkyl, sulfo or sulfonamido;

Ar is phenyl, phenyl X substituted, or heteroaryl such as pyridyl, thienyl, furyl, thiazoyl, triazolyl or such groups substituted by X; and M is hydroxy, alkoxy, NR′R″ wherein R′ and R″ are each hydrogen, alkyl or hydroxyalkyl, and the pharmaceutically acceptable salt of the acid; and when

is in ring two, X is hydrogen.

In the still more preferred aspect of this invention;

R is hydrogen or $C_{1-5}$ alkyl;

X and Y are each hydrogen, halogen (chloro, bromo, fluoro), $C_{1-5}$ alkyl, $C_{1-5}$ alkoxy, amino, $C_{1-5}$ alkylamino, $C_{1-5}$ dialkylamino, $C_{1-5}$ alkylthio, $C_{1-5}$ alkylsulfinyl, $C_{1-5}$ alkylsulfonyl, trifluoromethyl, cyano, nitro, hydroxy, $C_{1-5}$ alkanoyloxy or $C_{1-5}$ alkanoylamino and X preferably in the 6 or 7 position of the ring;

Ar is phenyl and phenyl substituted by the preferred X groups above;

M is hydroxy or $C_{1-5}$ alkoxy; and

is in ring one.

In the most preferred aspect of this invention;

R is hydrogen and $C_{1-5}$ alkyl (especially hydrogen);

X is hydrogen, $C_{1-5}$ alkoxy, $C_{1-5}$ alkylthio, $C_{1-5}$ alkylsulfinyl, cyano, fluoro or chloro;

Ar is phenyl or phenyl substituted by fluoro (especially o or p fluoro), chloro (especially o or p chloro) bromo (especially o or p bromo) $C_{1-5}$ alkyl, $C_{1-5}$ alkylthio (especially p-$C_{1-5}$ alkylthio), cyano, trifluoromethyl (especially m-trifluoromethyl) $C_{1-5}$ alkylsulfinyl, $C_{1-5}$ alkylsulfonyl or $C_{1-5}$ dialkylamino; and

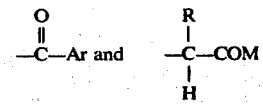

are meta to each other.

Representative compounds of the invention are: 1-(O-Fluorobenzoyl)-7-methylsulfinylnaphthalene-3-acetic acid, 2-[1-(O-fluorobenzoyl)-7-methylsulfinylnaphthalene-3]-propionic acids, 2-[(1-O-chlorobenzoyl)-7-methyl-sulfinylnaphthalene-3]-propionic acid, 2-[1-(p-chlorobenzoyl)-7-methylsulfinylnaphthalene-3]-propionic acid, 1-(p-chlorobenzoyl)-7-methylsulfinylnaphthalene-3-acetic acid, 2-[(1-p-cyanobenzoyl)-7-methylsulfinylnaphthalene-3]-propionic acid, 2-[(1-p-chlorobenzoyl)-7-methylthio-naphthalene-3]-propionic acid, 2-[1-(O-fluorobenzoyl)-7-methylthio-naphthalene-3]-propionic acid, 1-(p-chlorobenzoyl)-6-methylsulfinylnaphthalene-3-acetic acid, 2-[1-(p-chlorobenzoyl)-6-methylsulfinylnaphthalene-3]-propionic acid, 2-[1-benzoyl-7-methoxynaphthalene-3]-propionic acid, 2-[1-(p-methylsulfinylbenzoyl)-7-methoxynaphthalene-3]-propionic acid, 2-[1-(p-methylsulfinylbenzoyl)-7-dimethylamino (and monomethylamino)naphthalene-3]-propionic acid, 2-[1-benzoyl-7-trifluoromethylnaphthalene-3]-propionic acid, 2-[1-(p-methylsulfinylbenzoyl)-7-fluoronaphthalene-3]-propionic acid, 1-p-methylsulfinylbenzoyl-7-fluoronaphthalene-3-acetic acid, 1-p-methylsulfinylbenzoyl-7-chloronaphthalene- 3-acetic acid, 2-[1-p-methylsulfinylbenzoyl-7-cyanonaphthalene-3]-propionic acid.

The compounds of the instant invention can be used to treat inflammation by reducing inflammation and relieving pain in such diseases as rheumatoid arthritis, osteoarthritis, gout, infectious arthritis and rheumatic fever. The compounds of Formula I can also be used as an anti-pyretic and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil and acacia. Exemplary of liquid carriers are peanut oil, olive oil, seasame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The compounds of Formula I and of the compositions of this invention are to be administered in an amount sufficient to treat inflammation, that is, to reduce inflammation. Advantageously, the compositions will contain the active ingredient; namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The compounds of this invention may be conveniently prepared from their corresponding nitriles. These nitriles are new compounds and as such form another aspect of this invention. For example, the acids may be prepared by normal acid or basic hydrolysis of the nitrile. Similarly, the amides may be prepared by hydrolysis of the corresponding nitrile. The esters may be prepared by normal esterification of the acid compounds or alternatively in situ by hydrolysis and esterification of the corresponding nitriles.

The nitriles are prepared from the corresponding aroyl-haloalkyl naphthalene compounds by well known methods for displacing a halo group with a cyano group. The haloalkyl compounds which are also new compounds and form another aspect of this invention, are prepared by the following representative sequence of reactions.

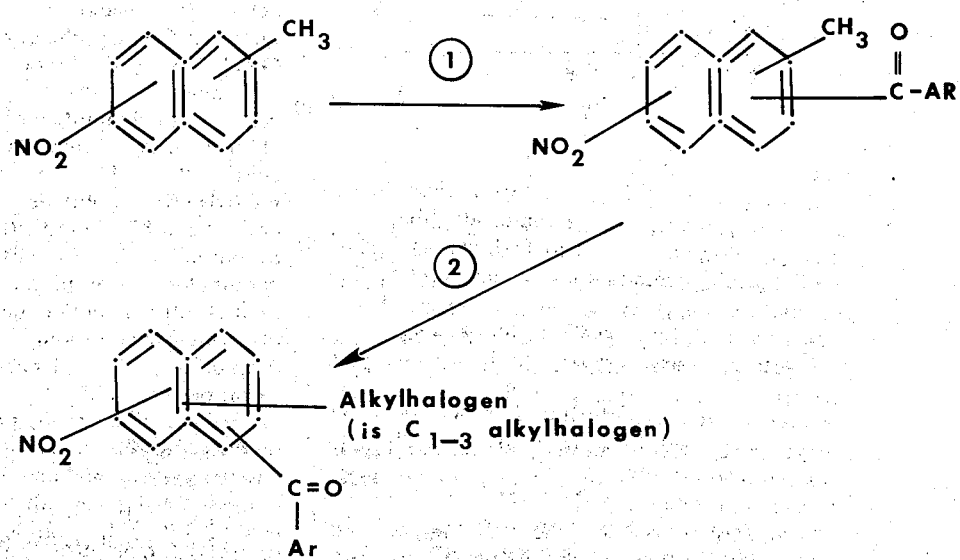

Step 1 is carried out under normal Friedel Crafts conditions i.e., with an acid catalyst such as AlCl$_3$, by reacting the appropriate naphthalene and acid halide compound. Step 2 is a well known halogenation reaction of an alkyl group. The reaction, for example, may be carried out at any desired temperature but preferably at elevated temperature with an N-halosuccinimide, preferably in an inert solvent.

Various desired substituents on the naphthalene ring are prepared from the nitro substituent after Step 1 and prior to Step 2. For example, when an alkylthio substitutent is desired, the 1-aroyl-3-methyl-7-nitronaphthalene is reduced by well known means to the amino group, the amino group is then diazotized and reacted with an alkylxanthate to form the desired alkylthio substituent. The alkylthio in turn, can be oxidized to the alkylsulfinyl and further oxidized to the alkylsulfonyl. Alternatively, the amino compound can undergo the well known Schiemann reaction to form the fluoro substituent. The amino compound may also undergo the Sandmeyer reaction to form the chloro or bromo substituent. Further, the amino substituent may be diazotized and coupled with an alkanol to yield the alkoxy substituent.

Because of the reaction sequence, some of the substituents on the naphthalene ring may be susceptable to attack during the course of the reaction. Therefore, although it is possible to prepare all of these groups immediately after Step 1, it is preferred to form these groups after the final acid compound has been prepared. For example, the alkylthio group may be obtained from the corresponding bromo compound via reaction with a copper alkylmercaptide. The alkylsulfinyl substituent may be obtained by oxidation of the corresponding alkylthio group under well known conditions. The cyano group may be obtained by displacement of a halo substituent such as reaction with a metal cyanide under well known conditions. The carboxamide group can be obtained by well known hydrolysis of the corresponding cyano group. The hydroxy group can be obtained by cleavage of the alkoxy group previously discussed under well known conditions for conversion of an alkoxy to hydroxy, such as with boron tribromide, pyridine hydrochloride, hydrogen bromide, aluminum chloride in benzene, and the like. The acylamino group can be obtained by the well known acylation of an amino group. The amino group is readily prepared by reduction of the nitro group which in turn can be mono alkylated to obtain the mono alkylamino group. Finally, the nitro group may be reductively alkylated to obtain the dialkylamino group.

Alternatively, when the aroyl-naphthalene acid compound is to be free of further substituents (X and Y is hydrogen), the halomethyl intermediate is prepared by forming a Grignard of an alkyl substituted halosubstituted naphthane and subsequent reaction of the Grignard compound with the appropriate aroylanhydride to form an alkyl substituted aroyl-substituted naphthalene compound. This compound in turn is reacted in accordance with Step 2 above to yield the desired haloalkyl naphthalene compound.

It is to be noted that the α-methyl acid compounds exist as optical isomers, each isomer as well as its mixture is part of this invention and when desired, the mixture can be separated by well known means for separating optical isomers.

The following Examples are given by way of illustration:

EXAMPLE 1

1-Benzoyl-3-methyl-7-nitronaphthalene and 1-benzoyl-2-methyl-6-nitronaphthalene 12.0 g. (0.065 m.) of 2-methyl-6-nitronaphthalene is added to a cold solution of 17.6 g. of aluminum chloride in 40 ml. of dry nitrobenzene. The ice-cooled, stirred mixture is then treated with 8.5 g. (0.06 m.) of benzoyl chloride, added dropwise. After allowing to go 30 hours at room temperature, ice and dilute hydrochloric acid are added, the mixture extracted with chloroform, the organic layer washed with bicarbonate solution, water, dried and concentrated in vacuo. After the nitrobenzene is removed under high vacuum, the residue is chromatographed on a silica gel column to yield 1-benzoyl-3-methyl-7-nitronaphthalene along with the isomeric 2-methyl-6-nitro compound.

When an equivalent amount of o-, m- and p- chlorobenzoyl; o-, m- and p-fluorobenzoyl; o-, m- and p- toluyl; o-, m- and p-anisoyl; o-, m- or p-methylthiobenzoyl; o-, m- or p-trifluoromethylbenzoyl; o-, m- or p-bromobenzoyl or p-nitrobenzoyl chlorides are used in place of benzoyl chloride in the above reaction, the corresponding substituted benzoylnaphthalene derivative is obtained.

Similarly, when an equivalent amount of 1-methyl-(or ethyl)- 6-nitronaphthalene, 2-methyl (or ethyl)- 7-nitronaphthalene, 1-methyl (or ethyl)- 5-nitronaphthalene, 1-methyl (or ethyl)- 8-nitronaphthalene, 2-methyl (or ethyl)- 5-nitronaphthalene or 2-methyl (or ethyl)-8-nitronaphthalene is used in place of 2-methyl-6-nitronaphthalene in the above example there is obtained 1-methyl (or ethyl)-4-benzoyl-6-nitronaphthalene, 2-methyl (or ethyl)-4-benzoyl-7-nitronaphthalene, 1-methyl (or ethyl)-4-benzoyl-5-nitronaphthalene, 1-methyl (or ehtyl)-4-benzoyl-8-nitronaphthalene 2-methyl (or ethyl)-4-benzoyl-5-nitronaphthalene, 2-methyl (or ethyl)-4-benzoyl-8-nitronaphthalene, respectively.

Similarly, when an equivalent amount of 2-methyl (or ethyl)-1-nitronaphthalene, 2-methyl (or ethyl)-3-nitronaphthalene or 2-methyl (or ethyl)-4-nitronaphthalene is used in place of 2-methyl-6-nitronaphthalene in the above example there is obtained 2-methyl (or ethyl)-1-nitro-5-benzoylnaphthalene, 2-methyl (or ethyl)-3-nitro-5-benzoylnaphthalene or 2-methyl (or ethyl)-4-nitro-5-benzoylnaphthalene, respectively.

Similarly, when an equivalent amount of 2-methyl-6-trifluoromethylnaphthalene is used in place of 2-methyl-6-nitronaphthalene in the above example, there is obtained 1-benzoyl-2-methyl-6-trifluoromethylnaphthalene and 1-benzoyl-3-methyl-7-trifluoromethylnaphthalene.

EXAMPLE 2

7-Amino-1-benzoyl-3-methylnaphthalene

A mixture of 1-benzoyl-3-methyl-7-nitronaphthalene (0.1 m.), ethanol (500 ml.) and 5 percent Palladium on carbon (2 g.) is reacted with hydrogen (40 p.s.i.) at room temperature until the theoretical hydrogen uptake is complete. The mixture is filtered, the cake washed well with ethanol, and the filtrate concentrated in vacuo to yield 7-amino-1-benzoyl-3-methylnaphthalene.

Similarly, when the substituted benzoylnitronaphthalenes (except the nitrobenzoyl and halobenzoyl derivatives) of Example 1 are used in an equivalent amount in place of 1-benzoyl-3-methyl-7-nitronaphthalene in the above procedure, the corresponding substituted benzoyl amino naphthalene is obtained.

Similarly, when the halo-substituted benzoyl nitronaphthalenes are used in the above procedure in place of 1-benzoyl-3-methyl-7-nitronaphthalene and an equivalent amount of 5 percent Ruthenium on a carbon catalyst is used in place of 5 percent Palladium on carbon, there is obtained the corresponding halo-substituted benzoylamino nitronaphthalenes.

Similarly, when an equivalent amount of the other benzoyl-nitronaphthalenes or nitro-benzoylnaphthalene compounds obtained from Example 1 are used in place of 1-benzoyl-3-methyl-7-nitronaphthalene in the above example, there is obtained the corresponding benzoylamino naphthalene and amino benzoylnaphthalene compounds.

EXAMPLE 3

1-Benzoyl-7-methoxy-3-methylnaphthalene

To a stirred mixture of i-amylnitrite (7 g., 0.06 m.) and dried methanol (120 ml.) at 50°C is added a mixture of 7-amino-1-benzoyl-3-methylnaphthalene (0.05 m.) and methanol (100 ml.) over ca. 1 hour. The mixture is then heated to reflux, kept there for 12 hours, the volatiles removed in vacuo, and the residue chromatographed on a silica-gel column to yield 1-benzoyl-7-methoxy-3-methylnaphthalene.

Similarly, when an equivalent amount of the substituted benzoyl-aminonaphthalene, halo-benzoylaminonaphthalene, benzoyl-aminonaphthalene or aminobenzoylnaphthalene compounds obtained from Example 2 are used in place of 7-amino-1-benzoyl-3-methylnaphthalene in the above example, there is obtained the substituted benzoyl-methoxynaphthalene, halo-benzoylmethoxynaphthalene, benzoyl-methoxynaphthalene and methoxy-benzoylnaphthalene compounds.

Similarly, when ethanol, butanol or isopropanol is used in place of methanol in the above example, there is obtained the corresponding ethoxy, butoxy and isopropoxy compounds.

EXAMPLE 4

1-Benzoyl-7-chloro-3-methylnaphthalene

To a stirred, cold mixture of concentrated hydrochloric acid (125 cc) and water (65 cc) is added 0.03 m. of 7-amino-1-benzoyl-3-methylnaphthalene, the mixture allowed to stir at ca. 0°–5°C for 1 hour, and a solution of sodium nitrite (0.033 m.) in water added slowly. When diazotization is complete, a solution of cuprous chloride (13 g.) in a mixture of concentrated hydrochloric acid (65 ml.)-water (65 ml.) is added over 10 minutes, keeping the temperature of the reaction mixture ca. 0°C. The resulting mixture is allowed to warm to room temperature, stirred overnight, ice and water added, and the mixture extracted with chloroform. Chromatography of the residue obtained upon removing the chloroform yields 1-benzoyl-7-chloro-3-methylnaphthalene.

When cuprous bromide and hydrobromic acid are used in place of the corresponding chloro compounds, the 7-bromo analog is obtained.

Similarly, when an equivalent amount of the substituted benzoyl-aminonaphthalene, halo-benzoylaminonaphthalene, benzoyl-aminonaphthalene or aminobenzoylnaphthalene compounds obtained from Example 2 are used in place of 7-amino-1-benzoyl-3-methylnaphthalene in the above example, there is obtained the corresponding substituted benzoyl-chloronaphthalene, halo-benzoylchloronaphthalene, benzoyl-chloronaphthalene or chlorobenzoylnaphthalene compounds, respectively.

EXAMPLE 5

1-Benzoyl-7-fluoro-3-methylnaphthalene

When the original diazonium solution of Example 4 is treated with a 40 percent solution of fluoroboric acid (12 ml.) and the diazonium fluoroborate produced collected, washed with a small amount of water, ethanol, and finally ether, and the dried salt pyrolyzed slightly above its decomposition point (in small batches), crude 1-benzoyl-7-fluoro-3-methylnaphthalene is obtained. Purification is executed by chromatography on a silica-gel column.

In a similar fashion, when the diazonium solution obtained from the substituted benzoyl-aminonaphthalene, halo-benzoyl-aminonaphthalene, benzoyl-aminonaphthalene or amino-benzoylnaphthalene in Example 4 are reacted as described above, the corresponding substituted benzoylfluoronaphthalene, halo-benzoyl-fluoronaphthalene, benzoylfluoronaphthalene or fluoro-benzoylnaphthalene compounds are obtained.

EXAMPLE 6

1-Benzoyl-3-methyl-7-methylthionaphthalene

A. 1-Benzoyl-3-methyl-7-mercaptonaphthalene

To a stirred mixture of 15.0 ml. of hydrochloric acid and 15.0 g. of crushed ice, external cooling, is added 0.075 m. of 7-amino-1-benzoyl-3-methylnaphthalene. The mixture is cooled to 0°C and a cold solution of sodium nitrite (5.5 g., 0.08 m.) in 12.5 ml. of water is slowly added, keeping the temperature below 5°C. After diazotization is complete, the mixture is added to a warm (40°C) solution of potassium ethyl xanthate (14.0 g.) in 20 ml. of water. The addition takes ca. 1 hour. After an additional hour at 40°–45°C, the oily xanthate is separated and the aqueous mixture extracted well with ether, the combined oil and extracts washed well with water, dried, and concentrated to a residue. Hydrolysis of the xanthate is then accomplished by warming the residue in 50 ml. of ethanol while adding 17.5 g. of potassium hydroxide pellets. After heating for eight hours, the mixture is acidified to Congo red paper, heated for a short time in the presence of 0.2 g. zinc dust, and the mixture extracted with chloroform, to yield crude 1-benzoyl-3-methyl-7-mercaptonaphthalene.

B. 1-Benzoyl-3-methyl-7-methylthionaphthalene

A solution of deaerated 2N sodium hydroxide solution (200 ml.) is added to the crude mercapto compound from A, deaeration continuing. 28 Ml. (0.3 m.) of dimethylsulfate is added dropwise over 1.5 hr. keeping the temperature less than 30°C. After stirring overnight at room temperature, the mixture is acidified, extracted with chloroform, and the material obtained from the chloroform chromatographed on a silica-gel column to yield 1-benzoyl-3-methyl-7-methylthionaphthalene.

Similarly, when an equivalent amount of the substituted benzoyl-aminonaphthalene, halo-benzoylaminonaphthalene, benzoyl-aminonaphthalene or aminobenzoylnaphthalene compounds obtained from Example 2 are used in place of 7-amino-1-benzoyl-3-methylnaphthalene in Example 6A above, there is obtained the corresponding substituted benzoyl-mercaptonaphthalene, halo-benzoyl-mercaptonaphthalene, benzoyl-mercaptonaphthalene and mercapto-benzoylnaphthalene compounds.

Similarly, when the above mercapto compounds are reacted in accordance with Example 6B above, there is obtained the corresponding methylmercapto compounds.

EXAMPLE 7

1-(p-Chlorobenzoyl)-3-methylnaphthalene

The Grignard reagent prepared from 20 g., 0.09 m.) of 1-bromo-3-methylnaphthalene in 50 ml. ether and 10 ml of benzene is added rapidly to a hot stirred mixture of 29.5 g., 0.1 m. p-chlorobenzoic anhydride and 100 ml. benzene, the resulting mixture refluxed six hours, cooled and added to excess cold dilute hydrochloric acid. The layers are separated, the aqueous extracted with methylene chloride, and the combined organic layers concentrated in vacuo to yield crude 1-(p-chlorobenzoyl)-3-methylnaphthalene, purified via recrystallization or chromatography on a silica-gel column.

When 1-bromo-4-methylnaphthalene, 1-bromo-2-methylnaphthalene, 1-bromo-7 (or 5, 6 or 8)-methoxy-3-methylnaphthalene, 1-bromo-7-fluoro-3-methylnaphthalene, 1-bromo-3-methyl-7-nitronaphthalene, 1-bromo-6-chloro-3-methylnaphthalene, 1-bromo-3-methyl-6-phenylnaphthalene above, 1-bromo-3-methyl 6 (or 5, 7 or 8)-phenoxynaphthalene, 1-bromo-3-ethylnaphthalene, or 1-bromo-3-methyl-5-(trifluoromethyl)naphthalene are used in place of 1-bromo-3-methylnaphthalene in the above example, the corresponding substituted benzoyl naphthalene is obtained.

When benzoic, o- or m-chlorobenzoic, o-, m-, or p-fluorobenzoic, o-, m-, or p-bromobenzoic, p-, m-, or p-nitrobenzoic, o-, m-, or p-trifluoromethylbenzoic anhydrides are used in place of p-chlorobenzoic anhydride in the example above, the corresponding (substituted benzoyl) naphthalene is obtained.

EXAMPLE 8

3-(Bromomethyl)-1-(p-chlorobenzoyl)-naphthalene

A mixture of 1-(p-chlorobenzoyl)-3-methylnaphthalene (0.01 m.) and pure N-bromosuccinimide (0.01 m.) in carbon tetrachloride (50 ml.) is refluxed until precipitation of succinimide is completed. The mixture is allowed to cool, the succinimide removed by filtration, the filtrate concentrated in vacuo to yield crude 3-(bromomethyl)-1-(p-chlorobenzoyl)-naphthalene.

Similarly, when an equivalent amount of the substituted benzoylnaphthalene, benzoyl-nitronaphthalene or nitro-benzoylnaphthalene of Example 1; the substituted benzoyl methoxynaphthalene, halo-benzoyl-methoxynaphthalene, benzoyl-methoxynaphthalene or methoxynaphthalene compounds of Example 3; or the substituted benzoyl (chloro or fluoro) naphthalene, halo-benzoyl (chloro or fluoro) naphthalene, benzoyl (chloro or fluoro) naphthalene, or (chloro or fluoro) benzoylnaphthalene compound obtained from Examples 4 and 5; or the substituted benzoyl (or methylthio) naphthalene, halobenzoyl (or methylthio) naphthalene, benzoyl (or methylthio) naphthalene or methylthio-benzoylnaphthalene compounds obtained from Example 6; or the benzoyl or substituted benzoyl naphthalene compounds obtained from Example 7 are used in place of 1-(p-chlorobenzoyl)-3-methylnaphthalene in the above example, there is obtained the corresponding bromomethyl or $\beta$-bromoethyl compounds.

Similarly, when an equivalent amount of 1-benzoyl-2-methyl-6-trifluoromethylnaphthalene or 1-benzoyl-3-methyl-7-trifluoromethylnaphthalene is used in place of 1-(p-chlorobenzoyl)-3-methylnaphthalene in the above example, there is obtained 1-benzoyl-2-bromomethyl-6-trifluoromethylnaphthalene and 1-benzoyl-3-bromomethyl-7-trifluoromethylnaphthalene.

EXAMPLE 9

1-(p-Chlorobenzoyl)-naphthalene-3-acetonitrile

To a stirred mixture of sodium cyanide (0.08 m.) in dry dimethylsulfoxide (50 ml.) at 65°C is added 3-bromomethyl-1-(p-chlorobenzoyl)-naphthalene (0.06 m.) in a minimum of fresh dimethylsulfoxide over 40 minutes. The temperature is raised to 75°C, kept 1 hour, allowed to cool, diluted with water, extracted with chloroform, the combined chloroform extractions dried over sodium sulfate and concentrated in vacuo to crude 1-(p-chlorobenzoyl)-naphthalene-3-acetonitrile.

Similarly, when an equivalent amount of the other bromomethyl or bromoethyl compounds obtained from Example 8 are used in place of 3-bromomethyl-1-(p-chlorobenzoyl)-naphthalene in the above example, there is obtained the corresponding cyanomethyl or $\beta$-cyanoethyl compounds.

Similarly, when an equivalent amount of 1-benzoyl-2-bromomethyl-6-trifluoromethylnaphthalene or 1-benzoyl-3-bromomethyl-7-trifluoromethylnaphthalene obtained from Example 8 is used in place of 1-(p-chlorobenzoyl)-3-bromomethylnaphthalene in the above example, there is obtained 1-benzoyl-2-cyanomethyl-6-trifluoromethylnaphthalene or 1-benzoyl-3-cyanomethyl-7-trifluoromethylnaphthalene.

EXAMPLE 10

2-(4-Benzoylnaphthalene-2-yl)-propionitrile

To a cooled solution of 4-benzoylnaphthalene-2-acetonitrile (0.045 m.) in benzene (100 ml.) is added sodium amide powder (0.05 m.), and the mixture allowed to stir until evolution of ammonia is complete. After allowing the warm to room temperature, the mixture is recooled and methyliodide (0.06 m.) is added dropwise. The mixture is allowed to warm to room temperature, heated to reflux, kept for 4 hours, let cool, filtered, the benzene removed in vacuo after washing and drying, and the residue chromatographed on silica-gel to yield 2-(4-benzoylnaphthalene-2-yl)-propionitrile.

When the other cyanomethyl compounds of Example 9 are treated similarly, the corresponding propionitrile is obtained.

EXAMPLE 11

1-(p-Chlorobenzoyl)-naphthalene-3-acetic acid

A mixture of 1-(p-chlorobenzoyl)-naphthalene-3-acetonitrile (1 g.), glacial acetic acid (25 ml.) and 20 percent hydrochloric acid (25 ml.) is refluxed overnight, the mixture diluted with water, extracted with chloroform, the chloroform extractions concentrated in vacuo to a residue, and the residue purified by precipitation from a filtered dilute sodium hydroxide solution with dilute hydrochloric acid to give 1-(p-chlorobenzoyl)-naphthalene-3-acetic acid.

Similarly, when an equivalent amount of the other cyanomethyl or β-cyanoethyl compounds obtained from Example 9 or the propionitrile compounds from Example 10 are used in place of 1-(p-chlorobenzoyl)-naphthalene-3-acetonitrile in the above example, there is obtained the corresponding acetic acid or propionic acid compounds.

Similarly, when an equivalent amount of 1-benzoyl-2-cyanomethyl-6-trifluoromethylnaphthalene or 1-benzoyl-3-cyanomethyl-7-trifluoromethylnaphthalene obtained from Example 9 is used in place of 1-(p-chlorobenzoyl)-3-cyanomethylnaphthalene in the above example, there is obtained 1-benzoyl-6-trifluoromethylnaphthalene-2-acetic acid or 1-benzoyl-7-trifluoromethylnaphthalene-3-acetic acid.

EXAMPLE 12

1-(p-Chlorobenzoyl)-7-methylsulfinylnaphthalene-3-acetic acid

To a stirred solution of 1-(p-chlorobenzoyl)-7-(methylthio)-naphthalene-3-acetic acid in acetone-methanol at 5°C is added a solution of sodium metaperiodate (50% molar excess) in a minimum of water and the resulting mixture allowed to stir until precipitation of the sodium iodate is complete. The mixture is filtered, the filtrate diluted with water, and the acetone and methanol removed under a stream of nitrogen. The resultant precipitate is collected and recrystallized to yield 1-(p-chlorobenzoyl)-7-methylsulfinylnaphthalene-3-acetic acid.

When the other alkylthio compounds of Example 4 are oxidized with sodium metaperiodate, the corresponding sulfinyl compound is obtained.

Use of excess metaperiodate of elevated temperatures yields the corresponding sulfone, e.g., 1-(p-chlorobenzoyl)-7-methylsulfonylnaphthalene-3-acetic acid. The sulfones are also obtained via oxidation with other known oxidizing agents, e.g., hydrogen peroxide, peracetic acid, etc.

EXAMPLE 13

Methyl-1-benzoyl-7-bromonaphthalene-3-acetate

A mixture of 1-benzoyl-7-bromonaphthalene-3-acetic acid (2.0 g.) in anhydrous methanol (50 cc.) containing two small drops of concentrated sulfuric acid is allowed to stir at room temperature until thin layer chromatography shows no acid remains. The mixture is concentrated in vacuo, below room temperature, to a small volume, the residue distributed between water-methylene chloride, the organic layer washed with dilute sodium bicarbonate solution, dried and concentrated in vacuo to yield methyl 1-benzoyl-7-bromonaphthalene-3-acetate.

When ethanol or butanol is used in place of methanol in the above reaction, the corresponding ethyl or butyl ester is obtained.

Similarly, when an equivalent amount of the acetic or propionic acid compounds of Example 11 are used in place of 1-benzoyl-7-bromonaphthalene-3-acetic acid in the above example, there is obtained the corresponding esters.

Similarly, when an equivalent amount of 1-benzoyl-6-trifluoromethylnaphthalene-2-acetic acid or 1-benzoyl-7-trifluoromethylnaphthalene-3-acetic acid obtained from Example 11 is used in place of 1-(p-chlorobenzoyl)-naphthalene-3-acetic acid in the above example, there is obtained their corresponding methyl esters.

EXAMPLE 14

Methyl 1-Benzoyl-7-cyanonaphthalene-3-acetate

A mixture of methyl 1-benzoyl-7-bromonaphthalene-3-acetate (0.02 m.), cuprous cyanide (0.03 m.) and freshly distilled N-methylpyrrolidone (25 ml.) is deaerated with nitrogen, a nitrogen atmosphere maintained, the stirred mixture heated to 180°C, kept 3 hours, allowed to cool, partitioned between chloroform — 7 percent hydrochloric acid containing ferric chloride (0.03 m.), the organic layer separated, dried and concentrated to crude methyl 1-benzoyl-7-cyanonaphthalene-3-acetate, purified via recrystallization or chromatography on silica gel using an ether-petroleum ether system as eluent.

Similarly, when an equivalent amount of the chloro-substituted naphthalene acetic or propionic esters obtained from Example 13 are used in the above reaction the corresponding methyl (cyano substituted)-benzylnaphthalene-3-acetates propionates are obtained.

Similarly, when an equivalent amount of the other bromonaphthalene acetic or propionic esters obtained from Example 13 are used in place of methyl 1-benzoyl-7-bromonaphthalene-3-acetate in the above example, there is obtained the corresponding cyano-naphthalene acetic or propionic acid esters.

EXAMPLE 15

7-Carbamyl-1-(p-chlorobenzoyl)-naphthalene-3-acetic acid

To concentrated sulfuric acid (10 ml.) at 3°–5°C, stirring, is added 1-(p-chlorobenzoyl)-7-cyanonaphthalene-3-acetic acid, (0.02 m.), the mixture stirred cold for 5 hours and then added to a 200 ml. ice-water mixture with stirring. The resultant 7-carbamyl-1-(p-chlorobenzoyl)-naphthalene-3-acetic acid is then collected, washed with water and dried.

Similarly, when an equivalent amount of the cyano-naphthalene acetic or propionic acid esters obtained from Example 14 is used in place of 1-(p-chlorobenzoyl)-7-cyanonaphthalene-3-acetic acid in the above example, there is obtained the corresponding carbamylnaphthalene acetic or propionic acid esters.

EXAMPLE 16

1-(p-chlorobenzoyl)-7-hydroxynaphthalene-3-acetic acid

To 1-(p-chlorobenzoyl)-7-methoxynaphthalene-3-acetic acid (0.001 m.) and methylene chloride (15 ml.) at −78°C is added 0.1 ml. boron tribromide. The resultant mixture is allowed to stir cold for 2.5 hours, then at ambient temperatures for 3 hours, ice cooled, several pieces of ice added to decompose the complex, the mixture filtered, the organic layer combined with the product collected on the filter, the methylene chloride removed and the residue recrystallized to yield 1-(p-chlorobenzoyl)-7-hydroxynaphthalene-3-acetic acid.

Similarly, when an equivalent amount of the other methoxy substituted naphthalene acetic or propionic acids obtained from Example 11 are used in place of 1-(p-chlorobenzoyl)-7-methoxynaphthalene-3-acetic acid in the above example, there is obtained the corresponding hydroxy substituted naphthalene acetic or propionic acids.

EXAMPLE 17

Methyl 7-amino-1-benzoylnaphthalene-3-acetate

A mixture of methyl 1-benzoyl-7-nitronaphthalene-3-acetate (0.01 m.), methanol (50 ml.) and 5% Pd/C (0.2 g.) is reacted with hydrogen (40 p.s.i.) at room temperature until theoretical hydrogen uptake is complete. The mixture is filtered, the cake washed well with methanol, and the filtrate concentrated in vacuo to yield methyl 7-amino-1-benzoylnaphthalene-3-acetate.

When the methanol in the above procedure is replaced by acetic anhydride, the corresponding 7-acetamido analog is obtained.

Similarly, when an equivalent amount of the other methyl nitronaphthalene acetate or propionate compounds of Example 13 are used in place of methyl 1-benzoyl-7-nitronaphthalene-3-acetate in the above example, there is obtained the corresponding methylaminonaphthalene acetate or propionate compounds.

EXAMPLE 18

Methyl 1-benzoyl-7-dimethylaminonaphthalene-3-acetate

A mixture of methyl 1-benzoyl-7-nitronaphthalene-3-acetate (0.008 m.), 37% formaldehyde solution (6.0 ml.), methanol (100 ml.), glacial acetic acid (50 ml.), and Raney Nickel (0.5 tsp.) is treated with hydrogen (40 p.s.i.) at room temperature. When uptake is complete, the mixture is filtered, the cake washed well with methanol, the solvent removed in vacuo at room temperature, the residue distributed between chloroform-sodium bicarbonate solution, the organic layer dried and concentrated to yield crude methyl 1-benzoyl-7-dimethylaminonaphthalene-3-acetate, purified via column chromatography on silica gel or saponified as is to the corresponding acetic acid.

Similarly, when an equivalent amount of acetaldehyde or propionaldehyde is used in place of formaldehyde in the above example, the corresponding diethyl or propyl derivative is obtained.

Similarly, when an equivalent amount of the other methyl nitronaphthalene acetate or propionate compounds obtained from Example 13 are used in place of methyl 1-benzoyl-7-nitronaphthalene-3-acetate in the above example, there is obtained the corresponding dimethylaminonaphthalene compounds.

EXAMPLE 19

Ethyl 1-benzoyl-7-methylaminonaphthalene-3-acetate

A. Ethyl 7-phthalimidomethylamino-1-benzoylnaphthalene-3-acetic acid

A mixture of ethyl 7-amino-1-benzoyl-naphthalene-3-acetate (0.015 m.), phthalimide (2.2 g., 0.015 m.), 37% formaldehyde (1.5 ml.) and ethanol (27 ml.) is refluxed on the steam cone for 3 hours, the intermediate 7-phthalimidomethyl derivative filtered off, washed with ethanol, dried and used as is in B below.

B. Ethyl 1-benzoyl-methylaminonaphthalene-3-acetate

The above 7-phthalimidomethylaminonaphthalene derivative (0.007 m.) is mixed with fresh ethanol (60 ml.) and 0.4 g. of Raney Nickel and subjected to a 1100 p.s.i. hydrogen atmosphere at 85°C for 8 hours. The cooled mixture is filtered, the catalyst washed well with ethanol, the ethanol stripped in vacuo, and the residue chromatographed on a silica gel column using an ether system as eluent to yield ethyl 1-benzoyl-7-methylaminonaphthalene-3-acetate.

Similarly, when an equivalent amount of the methyl aminonaphthalene acetate or propionate compounds obtained from Example 17 are used in place of ethyl 7-amino-1-benzoylnaphthalene-3-acetate in Example 19A above and the product reacted in accordance with Example 19B, there is obtaind the corresponding methyl methylaminonaphthalene-acetate or propionate compounds.

EXAMPLE 20

2-Methyl-6-trifluoromethylnaphthalene

A stainless steel lined shaker is charged with 6-methyl-2-naphthoic acid (0.2 m.) under a nitrogen atmosphere, the system cooled to dry-ice temperatures, and sulfur tetrafluoride (ca. 1.0 m.) condensed into the tube. The mixture is then heated at 120°C for 8 hours, cooled, vented, the residual material taken up in ether, filtered, concentrated. The material thus obtained is then chromatographed on silica gel to yield 2-methyl-6-trifluoromethylnaphthalene.

EXAMPLE 21

7-Acetoxy-1-(o-fluorobenzoyl)-naphthalene-3-acetic acid

A mixture of 1-(o-fluorobenzoyl)-7-hydroxynaphthalene-3-acetic acid (2.0 g.), acetic anhydride (20 cc.) and freshly fused zinc chloride (0.3 g.) is heated on the steam cone for 3 hours, cooled, added to 100 cc. of an ice-water mixture, and allowed to stir at ambient temperatures overnight. Decantation of the aqueous-acetic acid layer from the deposited material, followed by several water washings leaves 7-acetoxy-1-(o-fluorobenzoyl)-naphthalene-3-acetic acid.

When propionic or butyric anhydride is used in place of acetic anhydride in the above reaction, the corresponding propionoxy or butyoxy compound is obtained.

Similarly, when an equivalent amount of the other hydroxynaphthalene acetic or propionic acid compounds obtained from Example 16 are used in place of 1-(o-fluorobenzoyl)-7-hydroxynaphthalene-3-acetic acid in the above example, there is obtained the corresponding acetoxynaphthalene acetic or propionic acids.

Similarly, when an equivalent amount of methyl 1-benzoyl-7-aminonaphthalene-3-acetate or the other methyl aminonaphthalene acetate or propionate compounds obtained from Example 18 are used in place of 1-(o-fluorobenzoyl)-7-hydroxynaphthalene-3-acetic acid in the above example, there is obtained the corresponding methyl 1-benzoyl-7-acetylaminonaphthalene-3-acetate, methyl acetylaminonaphthalene acetate or propionate compounds.

EXAMPLE 22

1-(o-fluorobenzoyl)-7-methylsulfinylnaphthalene-3-acetic acid.

A mixture of 260 parts of 1-(o-fluorobenzoyl)-7-methylsulfinylnaphthalene-3-acetic acid and 25 parts of lactose is granulated with suitable water and to this is added 100 parts of maize starch. The mass is passed through a 16 mesh screen. The granules are dried at a temperature below 60°C. The dry granules are passed through a 16 mesh screen and mixed with 3.8 parts of magnesium stearate. They are then compressed into tablets suitable for oral administration.

What is claimed is:

1. A compound of the formula:

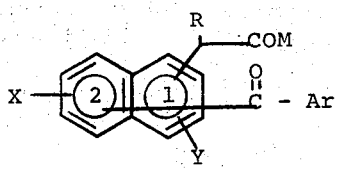

wherein
R is hydrogen or $C_{1-5}$ alkyl;
X and Y are each hydrogen, halogen, $C_{1-5}$ alkyl, amino, $C_{1-5}$ alkylamino, $C_{1-5}$ dialkylamino, nitro or trifluoromethyl;
Ar is phenyl, X-substituted phenyl; and
M is hydroxy, $C_{1-5}$ alkoxy, NR'R'' wherein R' and R'' are each hydrogen, $C_{1-5}$ alkyl or hydroxy $C_{1-5}$ alkyl, and the pharmaceutically acceptable salts of the acid; and when

is attached to ring number two, X is hydrogen.

2. A compound of the formula:

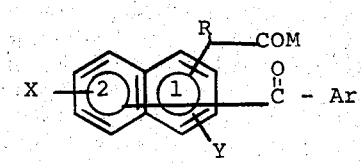

wherein
R is hydrogen or $C_{1-5}$ alkyl
X and Y are each hydrogen, halogen, $C_{1-5}$ alkyl, $C_{1-5}$ alkoxy, amino, $C_{1-5}$ alkylamino, $C_{1-5}$ dialkylamino, $C_{1-5}$ alkylthio, $C_{1-5}$ alkylsulfinyl, $C_{1-5}$ alkylsulfonyl, trifluoromethyl, cyano, carbamyl, nitro, hydroxy, $C_{1-5}$ alkanoyloxy or $C_{1-5}$ alkanoylamino;
Ar is phenyl and phenyl substituted by X;
M is hydroxy or $C_{1-5}$ alkoxy; and

is in ring one.

3. The compound of claim 2 wherein
R is hydrogen and $C_{1-5}$ alkyl;
X is hydrogen, $C_{1-5}$ alkoxy, $C_{1-5}$ alkylthio, $C_{1-5}$ alkylsulfinyl, cyano, fluoro or chloro;
Ar is phenyl or phenyl substituted by fluoro, chloro, or bromo, $C_{1-5}$ alkyl, $C_{1-5}$ alkylthio, cyano trifluoromethyl, $C_{1-5}$ alkylsulfinyl, $C_{1-5}$-alkylsulfonyl or $C_{1-5}$ dialkylamino; and

and

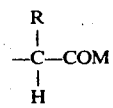

are meta to each other.

4. The compound of claim 3 wherein:
R is hydrogen or $C_{1-5}$ alkyl;
Ar is phenyl or phenyl substituted by halo, cyano, $C_{1-5}$ alkylthio or $C_{1-5}$ alkylsulfinyl;
Y is hydrogen;
X is halo, cyano, $C_{1-5}$ alkylsulfinyl, $C_{1-5}$ alkylthio, $C_{1-5}$ alkoxy, hydroxy, trifluoromethyl, $C_{1-5}$ dialkylamino or $C_{1-5}$ alkylamino; and
M is hydroxy or $C_{1-5}$ alkoxy.

5. The compound of claim 4 wherein: R is hydrogen.
6. The compound of claim 4 wherein: R is methyl.
7. The compound of claim 4 wherein: Ar is fluorophenyl, chlorophenyl or phenyl; X is methylsulfinyl, methylthio or methoxy; and M is hydroxy.
8. The compound of claim 7 wherein:
Ar is o-fluorophenyl; and
X is methylsulfinyl.
9. The compound of claim 7 wherein:
Ar is o-fluorophenyl; and
M is methylthio.
10. The compound of claim 7 wherein:
Ar is o-fluorophenyl; and
X is methoxy.
11. The compound of claim 7 wherein:
Ar is phenyl; and
X is methoxy.
12. The compound 1-p-chlorobenzoyl)-naphthalene-3-acetic acid.

* * * * *